United States Patent
Reddy et al.

(10) Patent No.: US 7,073,584 B2
(45) Date of Patent: Jul. 11, 2006

(54) PROCESSES FOR INCORPORATING INERT GAS IN A CEMENT COMPOSITION CONTAINING SPHERICAL BEADS

(75) Inventors: B. Raghava Reddy, Duncan, OK (US); Frank Zamora, Duncan, OK (US); Ronald J. Crook, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 204 days.

(21) Appl. No.: 10/706,431

(22) Filed: Nov. 12, 2003

(65) Prior Publication Data

US 2005/0098317 A1    May 12, 2005

(51) Int. Cl.
E21B 33/138 (2006.01)

(52) U.S. Cl. .................... 166/293; 166/305.1

(58) Field of Classification Search ............... None
See application file for complete search history.

(56) References Cited

U.S. PATENT DOCUMENTS

| | | | |
|---|---|---|---|
| 2,288,557 A | 6/1942 | Vollmer | |
| 3,036,633 A | 5/1962 | Mayhew | 166/31 |
| 3,220,863 A | 11/1965 | Mayhew | 106/96 |
| 3,591,394 A | 7/1971 | Diggelmann et al. | 106/87 |
| 3,669,701 A | 6/1972 | Biederman, Jr. | 106/120 |
| 3,804,058 A | 4/1974 | Messenger | 166/292 |
| 3,902,911 A | 9/1975 | Messenger | 106/97 |
| 4,234,344 A | 11/1980 | Tinsley et al. | 106/88 |
| 4,304,298 A | 12/1981 | Sutton | 166/293 |
| 4,340,427 A | 7/1982 | Sutton | 109/87 |
| 4,367,093 A | 1/1983 | Burkhalter et al. | 106/87 |
| 4,370,166 A | 1/1983 | Powers et al. | 106/97 |
| 4,450,010 A | 5/1984 | Burkhalter et al. | 106/87 |
| 4,515,635 A | 5/1985 | Rao et al. | 106/90 |
| 4,555,269 A | 11/1985 | Rao et al. | 106/90 |
| 4,565,578 A | 1/1986 | Sutton et al. | 106/87 |
| 4,818,288 A | 4/1989 | Aignesberger et al. | 106/90 |
| 5,484,019 A | 1/1996 | Griffith | 166/293 |
| 5,571,318 A | 11/1996 | Griffith et al. | 106/725 |
| 5,588,489 A | 12/1996 | Chatterji et al. | 166/293 |
| 5,613,558 A * | 3/1997 | Dillenbeck, III | 166/293 |
| 5,696,059 A | 12/1997 | Onan et al. | 507/269 |
| 5,711,801 A | 1/1998 | Chatterji et al. | 106/789 |
| 5,716,910 A | 2/1998 | Totten et al. | 507/102 |
| 5,791,380 A | 8/1998 | Onan et al. | 138/149 |
| 5,851,960 A | 12/1998 | Totten et al. | 507/118 |
| 5,996,693 A * | 12/1999 | Heathman | 166/291 |
| 6,060,535 A | 5/2000 | Villar et al. | 523/130 |
| 6,063,738 A | 5/2000 | Chatterji et al. | 507/269 |
| 6,244,343 B1 | 6/2001 | Brothers et al. | 166/293 |
| 6,312,515 B1 | 11/2001 | Barlet-Gouedard et al. | |
| 6,367,549 B1 | 4/2002 | Chatterji et al. | 166/292 |
| 6,457,524 B1 | 10/2002 | Roddy | 166/293 |
| 6,478,868 B1 | 11/2002 | Reddy et al. | 106/696 |
| 6,508,305 B1 | 1/2003 | Brannon et al. | 166/293 |
| 6,516,883 B1 | 2/2003 | Chatterji et al. | 166/293 |
| 6,562,122 B1 | 5/2003 | Dao et al. | 106/705 |
| 6,601,647 B1 | 8/2003 | Brothers et al. | 166/293 |
| 6,631,766 B1 | 10/2003 | Brothers et al. | 166/293 |
| 6,874,578 B1 | 4/2005 | Garnier et al. | |
| 2003/0116064 A1 | 6/2003 | Danican et al. | |
| 2003/0168215 A1 | 9/2003 | Drochon et al. | |
| 2005/0166803 A1 | 8/2005 | Dillenbeck et al. | |

FOREIGN PATENT DOCUMENTS

| | | |
|---|---|---|
| EP | 0 814 067 A1 | 12/1997 |
| EP | 0 712 817 B1 | 5/1999 |
| EP | 1 236 701 A1 | 9/2002 |
| EP | 1 394 137 A2 | 3/2004 |
| GB | 2 048 234 A | 12/1980 |
| GB | 2 387 593 A | 10/2003 |
| WO | WO 00/20350 | 4/2000 |
| WO | WO 00/29351 | 5/2000 |
| WO | WO 01/09056 A1 | 2/2001 |
| WO | WO 01/87796 A1 | 11/2001 |
| WO | WO 01/87797 A1 | 11/2001 |

OTHER PUBLICATIONS

Halliburton brochure entitled "CFR-3 Cement Friction Reducer Dispersant" dated 1998.
Halliburton brochure entitled "Halad®-344 Fluid-Loss Additive" dated 1998.

(Continued)

Primary Examiner—Zakiya W. Bates
(74) Attorney, Agent, or Firm—Craig W. Roddy; Conley Rose, P.C.

(57) ABSTRACT

The present invention provides a process for forming cement in a well bore. In this process, a cement composition is formed that comprises a cement and one or more beads mixed with the cement. The cement composition containing the beads is displaced into the well bore, and an inert gas phase is introduced to the cement composition to control a density of the cement composition. The inert gas phase can be introduced by adding a gas generating material to the cement composition and/or a porous material to the cement composition. In an embodiment, the gas generating material is a nitrogen generating material that may be activated by an oxidizing agent. In another embodiment, the gas generating material is a hydrogen generating material, e.g., an aluminum powder. The present invention further provides a cement composition comprising a cement, one or more beads combined with the cement, and an inert gas phase created by, e.g., a gas generating material and/or a porous material.

20 Claims, No Drawings

OTHER PUBLICATIONS

Halliburton brochure entitled "Silicalite Cement Additive" dated 1999.

Halliburton brochure entitled "Spherelite Cement Additive" dates 1999.

Halliburton brochure entitled "Zoneseal$^{SM}$ Isolation Process" dated 1998.

Brochure entitled "3M Specialty Materials For the Oil & Gas Industry" dated Jun. 2001.

Brochure entitled "3M™ Microspheres" dated Sep. 2000.

Brochure entitled "3M Schotchlite™ Glass Bubbles" dated Jul. 1999.

U.S. Appl. No. 10/159,588, filed May 31, 2002 entitled "Methods of. Generating Gas In Well Treating Fluids," by B. Raghava Reddy et al.

U.S. Appl. No. 10/159,001 filed May 31, 2002 entitled "Methods of Generating Gas In and Foaming Well Cement Compositions," by B. Raghava Reddy et al.

U.S. Appl. No. 10/159,590 filed May 31, 2002 entitled "Methods of Generating Gas In Well Fluids," by B. Raghava Reddy et al.

Foreign communication from a related counterpart application dated Mar. 24, 2005.

Ripley, H.E. et al., "Ultra-Low Density Cementing Compositions" dated 1980, Paper No. 80-31-19.

Harms, W.M. et al., "Microspheres cut density of cement slurry," Oil & Gas Journal dated Feb. 2, 1981, pp. 59-66.

Smith, Robert C. et al., "A New Ultra-Lightweight Cement With Super Strength", Journal of Petroleum Technology, pp. 1438-1444. dated 1980.

Harness, P.E. et al., "New Technique Provides Beter Low-Density-Cement Evaluation" dated 1992, SPE 24050.

Moulin, Eric, et al., "Using Concrete Technology To Improve The Performance of Lightweight Cements" dated 1997, SPE/IADC 39276.

Revil,Phillipe et al., "A New Approach to Designing High-Performance Lightweight Cement Slurries for Improved Zonal Isolation in . . . " dated 1998, IADC/SPE 47830.

Harris, K.L. et al., "New Lightweigth Technology for the Primary Cementing of Oilfield Casings in Cold Environments" dated 1991, SPE 22065.

Wu, C. et al., "High-Strength Microsphere Additive Improves Cement Performance in Gulf of Bohai" dated 1996, SPE 14094.

Murali, B.N. et al., "Field Performance of Ultralightweight Cement Slurry Compositions Used in The UAE" dated 1987, SPE 13692.

Harms, W.M. et al., "Ultralow-Density Cementing Operations" dated 1983.

\* cited by examiner

PROCESSES FOR INCORPORATING INERT GAS IN A CEMENT COMPOSITION CONTAINING SPHERICAL BEADS

FIELD OF THE INVENTION

This invention generally relates to well cementing. More specifically, the invention relates to processes for incorporating an inert gas phase in a cement composition comprising beads to thereby control the density of the cement composition and/or mechanical properties of the composition when placing the composition in a well bore.

BACKGROUND OF THE INVENTION

Well cementing is a process used in penetrating subterranean zones (also known as subterranean formations) to recover subterranean resources such as gas, oil, minerals, and water. In well cementing, a well bore is drilled while a drilling fluid is circulated through the well bore. The circulation of the drilling fluid is then terminated, and a string of pipe, e.g., casing, is run in the well bore. The drilling fluid in the well bore is conditioned by circulating it downwardly through the interior of the pipe and upwardly through the annulus, which is located between the exterior of the pipe and the walls of the well bore. Next, primary cementing is typically performed whereby a slurry of cement in water is placed in the annulus and permitted to set into a hard mass (i.e., sheath) to thereby attach the string of pipe to the walls of the well bore and seal the annulus.

Low density or lightweight cement compositions are commonly used in wells that extend through weak subterranean formations to reduce the hydrostatic pressure exerted by the cement column on the weak formation. Conventional lightweight cement compositions are made by adding more water to reduce the slurry density. Other materials such as bentonite, diatomaceous earth, and sodium metasilicate may be added to prevent the solids in the slurry from separating when the water is added. U.S. Pat. No. 4,370,166 discloses this method for forming lightweight cement compositions. Unfortunately, this method has the drawback that the addition of more water increases the cure time and reduces the strength of the resulting cement.

Lightweight cement compositions containing hollow spherical beads have been developed as a better alternative to the cement compositions containing large quantities of water. The hollow spherical beads reduce the density of the cement composition such that less water is required to form the cement composition. The curing time of the cement composition is therefore reduced. Further, the resulting cement has superior mechanical properties as compared to cement formed by adding more water. For example, the tensile and compressive strengths of the cement are greater.

The hollow spherical beads are usually cenospheres or glass spheres. Cenospheres are hollow spheres primarily comprising silica ($SiO_2$) and alumina ($Al_2O_3$) and are filled with gas. Cenospheres are a naturally occurring by-product of the burning process of a coal-fired power plant. Their size may vary from about 1 to 350 μm. Such hollow spherical beads suffer from the drawback of being fragile under pressure. Consequently, the hollow spherical beads tend to break when subjected to hydraulic pressures in excess of 1,000 psi. Unfortunately, hollow spherical beads mixed in a cement slurry can experience such pressures after placement of the slurry into a well bore. The collapse of the hollow spherical beads causes an increase in the density of the cement slurry. Therefore, the calculations of the quantity of slurry required to cement a given volume in the well bore are inaccurate because they are based on the density of the cement composition under atmospheric pressure (at the surface) rather than under the pressure existing downhole. To overcome this limitation, synthetic glass beads have been developed that have optimized wall thickness for withstanding the hydraulic pressure of the cement composition in the well bore. However, the cost of producing synthetic glass beads is very expensive. Another problem encountered when using a cement composition containing cenospheres is that the resulting cement exhibits high brittleness.

During the life of the well, the cement sheath is subjected to detrimental cyclical stresses due to pressure and/or temperature changes. A need therefore exists to develop a cement composition that can be used to form a less brittle cement having properties that enable it to withstand pressure and temperature fluctuations. It would also be desirable to maintain the density of the cement composition at a desired level after the cement composition is placed in a well bore, thereby ensuring that the surface calculations would be applicable to the downhole situation. The present invention advantageously utilizes a relatively inexpensive process to control the density of a cement composition containing spherical beads, even after those beads have collapsed under pressure. This process also improves the mechanical properties of the resulting cement, such as its brittleness, ductility, and resilience.

SUMMARY OF THE INVENTION

Processes for cementing a subterranean formation include forming a cement composition comprising a cement and one or more beads and introducing an inert gas phase to the cement composition. The cement composition may be displaced into a well bore in contact with the subterranean formation during or after incorporating the inert gas phase into the cement composition. The beads may be selected from the group consisting of cenospheres, glass spheres ceramic spheres, and combinations thereof. In an embodiment, the presence of the inert gas phase may compensate for the density increase caused by the collapse of the beads when subjected to downhole pressure. In another embodiment, the inert gas phase may be introduced to modify the properties of the cement composition. The inert gas phase can be introduced by adding one or more gas generating materials and/or porous materials to the cement composition and/or by injecting gas into the cement composition. The porous materials comprise openings in which air is disposed.

According to an embodiment, cement compositions comprise a cement, one or more beads combined with the cement, and an inert gas phase. Further, the cement compositions may comprise water for forming a pumpable slurry. In an embodiment, the cement compositions comprise a gas (e.g., nitrogen) generating material and/or a porous material having openings in which air is disposed for forming the inert gas phase. If the gas generating material is a nitrogen generating material, the cement composition further comprises an oxidizing agent for activating the nitrogen generating material.

DETAILED DESCRIPTION OF THE PREFERRED EMBODIMENTS

In accordance with an embodiment, processes for cementing a well bore comprise introducing an inert gas phase to a cement composition comprising beads mixed with a cement and a fluid such as water. As used herein, "bead" is defined as a particle added to the cement composition to lower its density, wherein the particle is preferably a substantially hollow object filled with gas that is spherical or substantially spherical in shape. The cement composition containing the beads and the inert gas phase may be used in a well cementing process. The well cementing process includes drilling a well bore down to the subterranean zone while circulating a drilling fluid through the well bore. A string of pipe, e.g., casing, is then run in the well bore. The drilling fluid is conditioned by circulating it downwardly through the interior of the pipe and upwardly through the annulus, which is located between the exterior of the pipe and the walls of the well bore. The cement composition of the present invention is displaced down through the pipe and up through the annulus. It is then allowed to set into a hard mass. In alternative embodiments, the cement composition may be used for other projects such as masonry or building construction.

Any known cement may be utilized in the cement composition, including hydraulic cement composed of calcium, aluminum, silicon, oxygen, and/or sulfur, which sets and hardens by reaction with water. Examples of suitable hydraulic cements are Portland cements, pozzolana cements, gypsum cements, phosphate cements, high alumina content cements, silica cements, and high alkalinity cements. Classes A, C, G, and H Portland cements are preferred, A sufficient amount of fluid is added to the cement to form a pumpable slurry. The fluid is preferably fresh water or salt water, i.e., an unsaturated aqueous salt solution or a saturated aqueous salt solution such as brine or seawater. The water may be present in the cement slurry in an amount ranging from about 30% to about 120% by weight of the cement in the composition, more preferably in an amount of about 35% to about 60%.

Examples of beads that may be employed in the cement composition include cenospheres. Particularly suitable cenospheres are SPHERELITE beads, which are commercially available from Halliburton, Inc. Other suitable beads include, but are not limited to, EXTENDOSPHERES beads commercially available from The PQ Corporation; FILLITE beads commercially available from Trelleberg Fillite, Inc.; and RECYCLOSPHERE beads and BIONIC BUBBLE beads, both of which are available from Sphere Services, Inc. Alternatively, the beads may be glass or ceramic microspheres ranging in size from about 10 to about 325 microns in diameter. Examples of such microspheres include SCOTCHLITE beads, which are commercially available from 3M Company. The beads may be dry blended with the cement before the addition of a fluid, they may be added as a suspension in a fluid to the cement, or they may be mixed with a cement slurry after the addition of a fluid. Dry blending of the beads with cement before the addition of a fluid is preferred. The amount of beads added to the cement composition may range from about 10% to about 100% by weight of the cement composition, depending on the desired density of the cement composition. For example, the density of the cement composition that may be achieved with the addition of the beads may range from about 8 pounds per gallon (ppg) to about 23 ppg.

The inert gas phase may be incorporated into the cement composition using any known method for introducing a gas into a liquid. In a preferred embodiment, the inert gas phase is incorporated by adding a porous material and/or a gas generating material to the cement composition. The porous material comprises openings in which air is contained, thereby forming the inert gas phase. Examples of suitable porous materials include, but are not limited to, refractory oxides such as silica, alumina, titania, thoria, zirconia, and mixtures thereof, e.g., silica-alumina. The porous material may be combined with the cement and the beads by dry blending or by adding it to a cement slurry before or during the displacement of the slurry into the well bore. An example of a commercially available porous material is SIPERNAT D13 material, which can be purchased from Degussa Corporation.

A gas generating material suitable for use in the cement composition produces gas in situ via a chemical reaction. For example, the gas generating material may be a nitrogen generating material that is activated by an oxidizing agent to primarily produce nitrogen. The nitrogen generating material may also produce small amounts of ammonia, carbon dioxide, and carbon monoxide depending on the chemical structure of the gas generating chemical and the oxidizing agent. Examples of suitable nitrogen generating materials include, but are not limited to, hydrazine, hydrazine salt of an, acid, odicarbonamide, azobis(isobutyronitrile), p-toluene sulfonyl hydrazide, p-toluene sulfonyl semicarbazide, p-p'-oxybis(benzenesulfonylhydrazide), carbodihydrazide, and combinations thereof. Carbodihydrazide is the preferred nitrogen generating material. Examples of suitable water soluble oxidizing agents include, but are not limited to, ammonium persulfate, sodium persulfate, potassium persulfate, sodium chlorite, sodium perborate, sodium peroxy carbonate, calcium hypochlorite, sodium hypochlorite, sodium bromite, sodium hypobromite, sodium bromate, sodium chlorate, and combinations thereof. Sodium chlorite is the preferred oxidizing agent. Additional disclosure regarding suitable nitrogen generating materials and oxidizing agents for use in the cement composition hereof can be found in U.S. Pat. No. 4,450,010 and in currently pending U.S. application Ser. Nos. 10/159588, 10/159001, and 10/159590 filed on May 31, 2002, each of which is incorporated by reference herein in its entirety.

In an embodiment, the oxidizing agent is introduced to the cement composition prior to displacing the cement composition into the well bore. The oxidizing agent may be mixed with the cement, the beads, and the fluid to form a pumpable cement slurry composition, followed by pumping the composition into the well bore. An aqueous solution or dispersion comprising the nitrogen generating material is then introduced to the cement composition downstream of the pumps used to displace the cement composition into the well bore. Upon contacting the nitrogen generating material, the oxidizing agent activates the nitrogen generating material to produce gas in the cement composition. In an alternative embodiment, the nitrogen generating material is introduced to the cement composition prior to displacing the cement composition into the well bore. The oxidizing agent is introduced to the cement composition downstream of the cement pumps such that it contacts and activates the nitrogen generating material. In yet another embodiment, the nitrogen generating material and the oxidizing agent are introduced to the cement composition simultaneously, preferably downstream of the cement pumps.

Another example of a gas generating material that may be utilized in the cement composition is a hydrogen generating material such as a metal that reacts with aqueous alkaline solutions or with water to yield hydrogen. Examples of suitable hydrogen generating materials include, but are not limited to, aluminum, calcium, zinc, magnesium, lithium, sodium, potassium, or mixtures thereof. Preferably, the hydrogen generating material is an aluminum powder. The aluminum powder may be dry blended with the cement and the beads before the addition of a fluid, suspended in a fluid before adding the fluid to the cement, or injected into a cement slurry as it flows into the well bore. The particle size of the aluminum powder and additional additives used in the cement slurry may be selected to ensure that the aluminum powder does not react to produce hydrogen until the slurry has been displaced into the well bore. For example, a chemical reaction inhibitor may be incorporated into the cement composition to retard the release of hydrogen gas until the desired time. Examples of suitable inhibitors include, but are not limited to, fatty acid esters of sorbitan such as sorbitan mono-oleate, sorbitan dioleate, sorbitan trioleate, triethanol amine, and diisopropyl amine. The rate of reaction of aluminum increases as the temperature increases and can also be affected by other additives in the cement slurry. For example, some conventional fluid loss additives slow the reaction rate. Therefore, in determining the amount of inhibitor to add to the cement composition, one should take into account the temperature in the well bore and the effects of other additives in the cement composition. Additional disclosure regarding suitable hydrogen generating materials and inhibitors for use in the cement composition hereof can be found in U.S. Pat. Nos. 4,340,427 and 4,367,093, which are incorporated by reference herein in their entirety.

An inert gas phase may also be introduced to the cement composition by directly injecting gas, e.g., nitrogen, into the cement composition containing the beads as the cement composition is being pumped into the well bore. The equipment required for storing the gas and injecting the gas into a cement composition is known in the art and can be quite elaborate and expensive.

According to an embodiment, the cement composition also comprises a mixture of foaming and foam stabilizing surfactants to facilitate the formation and stabilization of foam produced by the liberation of gas therein. An example of a mixture of foaming and foam stabilizing surfactants comprises a mixture of an ethoxylated alcohol ether sulfate surfactant, an alkyl or alkene amidopropylbetaine surfactant, and an alkyl or alkene amidopropyl-dimethylamine oxide surfactant. Such a surfactant mixture is described in U.S. Pat. No. 6,063,738, which is incorporated by reference herein in its entirety. The mixture of foaming and foam stabilizing surfactants may be present in the cement composition in an amount in the range of from about 0.5% to about 5% by weight of the water in the composition.

As deemed appropriate by one skilled in the art, the cement composition may further include additional additives for improving or changing the properties of the cement composition. Examples of such additives include, but are not limited to, set retarders, fluid loss control additives, dispersing agents, set accelerators, and formation conditioning agents.

According to an embodiment, the inert gas phase is introduced to the cement composition to maintain the density of the cement composition at a certain level despite the breakage of the beads under downhole pressure. As such, the calculations used to determine the quantity of cement composition required in the well bore, which are based on the density of the cement composition at the surface, are reliable and need not be modified.

The amount of gas in the cement composition is preferably sufficient to maintain the density of the composition in the well bore in a range of from about 8 to about 23 ppg when one or more of the beads break. A general method for calculating the amount of gas required to compensate for bead breakage may be arrived at as follows. A cement slurry containing a known amount of beads is subjected to increased pressures, and the resulting increase in slurry density is measured. Based on the increase in slurry density value, the actual specific gravity of the beads at a given pressure may be calculated. Table 1 below provides examples of such specific gravity values, as determined for SPHERELITE beads at different pressures.

TABLE 1

| Pressure (psi) | Specific gravity |
|---|---|
| 0 | 0.685 |
| 500 | 0.759 |
| 1000 | 0.785 |
| 2000 | 0.820 |
| 3000 | 0.864 |
| 4000 | 0.902 |
| 5000 | 0.943 |
| 6000 | 0.980 |

Depending on the well bore pressure acting upon a cement column containing the beads, loss in slurry volume due to bead breakage under pressure can be calculated. To compensate for the loss in slurry volume, a sufficient amount of gas is introduced into the slurry, which under well bore pressure and temperature occupies the same volume as that lost due to bead breakage. The volume occupied by a gas is dependent on pressure and temperature and can be calculated by the conventional equation given below:

$$PV = nRT$$

where P=pressure in atomspheres, V=volume in liters, n=moles of gas, R=universal gas constant, and T=temperature in Kelvins. When the gas is present in a fluid, the volume and density of such fluid can also be calculated by taking into account the actual volume of gas under the existing temperature and pressure. As illustrated by Table 2 below, the density value of a fluid containing 92.3% gas by volume at atmospheric pressure increases with increasing pressure due to decreased gas volume under pressure.

TABLE 2

| Pressure (psi) | % Nitrogen in Fluid by Volume | Fluid Density (ppg) |
|---|---|---|
| 14 (atmospheric pressure) | 92.3 | 0.937 |
| 50 | 84.2 | 1.93 |
| 100 | 74.9 | 3.07 |
| 300 | 51.8 | 5.89 |
| 500 | 39.4 | 7.41 |
| 700 | 31.7 | 8.35 |
| 1000 | 24.4 | 9.23 |
| 1500 | 17.7 | 10.05 |
| 2000 | 13.8 | 10.5 |
| 3000 | 9.8 | 10.8 |
| 5000 | 6.51 | 11.0 |

Similar calculations can be performed to account for the effect of temperature. Depending on the density increase for a cement slurry composition containing hollow beads due to bead breakage under well bore conditions, the amount of gas that needs to be introduced into the slurry to decrease the slurry density by the same amount can be calculated according to the equation given below:

% gas in slurry needed=100*density decrease in ppg/initial slurry density in ppg The composition of the cement slurry may comprise a sufficient amount of the porous material, the gas generating material, and/or the injected inert gas such that the desired slurry density under downhole conditions can be maintained.

According to another embodiment, the inert gas phase is incorporated into a cement composition containing beads to achieve improvement in mechanical properties such as reduced brittleness by decreasing its elastic modulus, reversible compressibility, and so forth. For example, incorporation of the inert gas phase reduces the elastic modulus of a cement composition by from about 5% to about 90%. The amount of gas incorporated for this purpose depends on the extent of property modification required.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner. The preparation of cement slurries in the following examples was performed in accordance with American Petroleum Institute (API) Specification 10A, $23^{rd}$ Edition, April 2002.

Example 1

A cement slurry was prepared by blending the following materials together: 700 grams of a cement/shale blend; 210 grams of SPHERELITE beads having a specific gravity of 0.68 (30% by weight of the cement (bwoc)); 14 grams of bentonite (2% bwoc); 2.45 grams of the sulfite adduct of an acetone-formaldehyde condensate (0.35% bwoc); and 742 grams of water (106% bwoc). Then ZONESEAL 2000 foaming and foam surfactant mixture available from Halliburton was added to the cement slurry in an amount of 1% by volume of the water. The density of the resulting slurry was measured to be 10.34 ppg. The slurry was foamed with agitation to incorporate 6.6 volume % of a gas phase (i.e., air) therein based on the total slurry volume. The density of the foamed slurry was 9.66 ppg. The foamed slurry was then subjected to a pressure of 3,000 psi for a period of 5 minutes to allow for breakage of the beads. The pressure was released, and the density of the slurry after pressure release was measured to be the same as the original slurry without the gas phase.

Example 2

A cement slurry was prepared as described in Example 1 above except that no foaming and foam surfactant was added to the slurry. The slurry was subjected to 3,000 psi for 5 minutes. The density of the slurry after releasing the pressure was 11.27 ppg, indicating that the slurry density had increased due to breakage of the beads. This measured density value is close to the predicted value of 11.08 ppg, as calculated based on the increased specific gravity of the SPHERELITE beads at 3,000 psi.

Example 3

This example illustrates the use of nitrogen generating compositions to compensate for the cement slurry density increase due to hollow bead breakage under pressure. To simulate downhole pressures, specialized equipment was built in accordance with the following procedure. A metal pipe made of 17-4 stainless steel, pressure rated for 30,000 psi, and having an outer diameter of 3.5 inches and an inner diameter of 2.44 inches was provided with Acme threads at the ton and the bottom. Four entry points were drilled in the metal pipe at equal distances from each other at about 2 feet from the bottom end. One hole was fitted with a thermocouple, the second and third holes were fitted to serve as ports for pumping or withdrawing fluids, and the fourth hole was provided with a plug. The inner chamber of the pipe was fitted with a sealed stirring mechanism connected to a paddle on the inside and an electric motor on the outside. The height of the paddle was such that the injected fluids entered at about the middle of the paddle. The chamber was provided with a tightly fitting piston provided with an o-ring and a rod. The top of the chamber was fitted with a lid assembly having a hole in the center through which the rod attached to the piston could move up and down. The lid assembly also had an inlet connected to a water supply line having an inline pump manufactured by Teledyne Sprague Engineering Corp. of California. A fluid pump was used to pump fluid into the chamber. The equipment was calibrated to read volume increase by measuring the length of the rod extending through the top lid assembly. An increase in length of the rod by one inch corresponded to 76.1 mL of a fluid volume.

The apparatus was pre-assembled to allow the space below the piston to become filled with 514 $cm^3$ of an aqueous fluid. A cement slurry was prepared by mixing 300 grams of a cement/shale blend, 26.5 grams of a carbohydrazide (1.56% bwoc), 150 grams of SPHERELITE beads (50% bwoc), 6 grams of bentonite (2% bwoc), and 270 grams of water (90% bwoc). A portion (250 cm3) of this slurry was introduced into the chamber through one of the injection ports, followed by adding 7.2 grams of the ZONESEAL 2000 foaming and foam stabilizing surfactant mixture to the slurry. The remaining available volume in the chamber was filled with additional slurry. The addition ports were plugged, and 100 mL of a solution containing 43% sodium chlorite by weight of the solution was injected into the chamber with the aid of a fluid injection pump manufactured by Ruska Instrument Corporation of Houston, Tex. The mixture was stirred. The slurry density of the final slurry mixture after injecting the chlorite solution was designed to be 10.34 ppg. A pressure of 750 psi was applied on the piston, and the mixture was stirred vigorously for 2 to 3 minutes. The pressure was increased to 2,500 psi and held constant at that pressure for 5 minutes to allow for the breakage of beads. The rod length increased by 0.63 inch, and the temperature increased to 145° F. due to gas generation (e.g., nitrogen) in the mixture. The increase in rod length corresponded to an increase in slurry volume by 48 mL due to the incorporation of nitrogen at 2,500 psi and 145° F., which was calculated to be equivalent to about 43 mL at room temperature and 2,500 psi. The % increase in the total slurry volume was calculated to be about 6.5%, corresponding to a slurry density of 9.7 ppg. This example shows that the introduction of gas to a cement slurry prevents an increase in slurry density due to bead breakage. It also shows that by adjusting the gas volume present in the cement slurry, density calculations need not be adjusted for loss of volume due to bead breakage.

Example 4

In this example, mechanical property modification of cement slurries containing hollow beads by inclusion of a gas phase was studied. A cement slurry having a gas phase and a reduced amount of beads was prepared to allow for inclusion of gas while keeping the slurry density at 13.38 ppg. The following materials were blended with 680 grams of water: 1,100 grams of Class A cement, 84.7 grams (7.7% bwoc) of SCOTCHLITE S60 beads, 55 grams (5% bwoc) of SILICALITE fumed silica available from Halliburton, Inc., 7.7 grams (0.7% bwoc) of HALAD 344 polymeric fluid loss additive available from Halliburton, Inc., and 2.2 grams (0.2% bwoc) of CFR-3 cement dispersant available from Halliburton, Inc. Then 12.57 grams (12% by volume of water) of ZONESEAL 2000 foaming and foam stabilizing surfactant mixture was mixed with 1,670 grams of the cement slurry and foamed with vigorous stirring until the volume of the foamed slurry reached 1,170 mL. The foamed slurry contained 10% air by volume of the slurry, and the density of the slurry was 12.0 ppg. The slurry was poured into 2×2×2 inch brass molds to measure its compressive strength according to the API Specification 10 referred to earlier, and it was poured into dog bone molds to take tensile strength measurements. The slurry was also poured into 2"×6" cylindrical brass molds to perform load versus displacement studies under unconfined and confined conditions using MTS load frame equipment manufactured by MTS Systems Corporation of Eden Prairies, Minnesota. Table 3 below shows the results of such measurements.

A control slurry without the gas phase was prepared by mixing 1,000 grams of Class A cement, 207 grams (20.7% bwoc) of SCOTCHLITE S60 glass beads, which has a specific gravity of 0.6, 50 grams (5% bwoc) of SILICALITE fumed silica, 7 grams (0.7% bwoc) of HALAD 344 polymeric fluid loss additive, 2 grams (0.2% bwoc) of CFR-3 cement dispersant, and 618 grams (61.8% bwoc) of water. The foamed slurry was poured in different molds as described above. The results of such measurements are presented below in Table 3.

TABLE 3

| Property | Control Slurry | Slurry with Gas Phase |
|---|---|---|
| Density, ppg | 12 | 12 |
| Compressive strength, psi | 4,160 | 2,440 |
| Tensile Strength, psi | 350 | 190 |
| Young's Modulus (unconfined), psi | 1.17E+6 | 8.06E+5 |
| Poisson's Ratio (unconfined) | 0.207 | 0.182 |
| Young's Modulus under Confining pressure | 1.04E+6 @ 985 psi confining pressure | 7.38E+5 at 485 psi confining pressure |
| Poisson's Ratio under Confining Pressure | 0.134 @ 985 psi confining pressure | 0.111 @ 485 psi confining pressure |

The results in Table 3 show that inclusion of a gas phase in the cement slurry lowered the elastic modulus, indicating improved ability of the cement composition to sustain imposed stresses elastically. The lower Poisson's ratio for the composition containing the gas indicates elastic deformation, radial or axial, of the composition under stress due to the presence of a compressible phase.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A process for cementing a subterranean formation, comprising:
   (a) forming a cement composition comprising a cement and one or more beads combined with the cement; and
   (b) introducing an inert gas phase to the cement composition via in situ formation of the inert gas while the cement composition is positioned in the well bore;
   wherein the inert gas phase compensates for the breakage of at least one of the beads.

2. The process of claim 1 wherein step (b) reduces an elastic modulus of the cement composition by from about 5% to about 90%.

3. The process of claim 1 wherein the beads are selected from the group consisting of cenospheres, glass spheres, ceramic spheres, and combinations thereof.

4. The process of claim 1 wherein the introducing the inert gas phase further comprises one or more of the following methods:
   (i) adding a porous material to the cement composition; and
   (ii) injecting gas directly into the cement slurry.

5. The process of claim 4, further comprising displacing the cement composition into a well bore in contact with the subterranean formation.

6. The process of claim 5, wherein the gas generating material is a nitrogen generating material, and further comprising introducing an oxidizing agent to the cement composition, the oxidizing agent being capable of activating the nitrogen generating material.

7. The process of claim 6 wherein the oxidizing agent is introduced to the cement composition prior to the displacing the cement composition, and wherein the nitrogen generating material is introduced to the cement composition during the displacing the cement composition such that the oxidizing agent activates the nitrogen generating material, thereby producing gas in the cement composition.

8. The process of claim 6 wherein the nitrogen generating material is introduced to the cement composition prior to the displacing the cement composition, and wherein the oxidizing agent is introduced to the cement composition during the displacing the cement composition such that the oxidizing agent activates the nitrogen generating material, thereby producing gas in the cement composition.

9. The process of claim 6 wherein the nitrogen generating material and the oxidizing agent are concurrently introduced to the cement composition during the displacing the cement composition.

10. The process of claim 6 wherein the nitrogen generating material is selected from the group consisting of hydrazine, hydrazine salt of an acid, azodicarbonamide, azobis(isobutyronitrile), p-toluene sulfonyl hydrazide, p-toluene sulfonyl semicarbazide, p-p'-oxybis(benzenesulfonylhydrazide), carbodihydrazide, and combinations thereof.

11. The process of claim 6 wherein the oxidizing agent is selected from the group consisting of ammonium persulfate, sodium persulfate, potassium persulfate, sodium chlorite, sodium perborate, sodium peroxy carbonate, calcium hypochlorite, sodium hypochlorite, sodium bromite, sodium hypobromite, sodium bromate, sodium chlorate, and combinations thereof.

12. The process of claim 4 wherein the gas generating material is a hydrogen generating material.

13. The process of claim 12 wherein the hydrogen generating material is selected from the group consisting of aluminum, calcium, zinc, magnesium, lithium, sodium, potassium, and combinations thereof.

14. The process of claim 12 wherein the hydrogen generating material is an aluminum powder.

15. The process of claim 1 wherein the inert gas phase is present in the cement composition in an amount effective to maintain a density of the cement composition in a range of from about 8 to about 23 lb/gal when one or more of the beads break.

16. The process of claim 1 wherein the compressive strength of the cement composition is at least about 2,000 pounds per square inch.

17. A method for cementing a well bore, comprising:

selecting a desired density for a down hole cement composition;

forming a cement composition having an actual density at the surface;

estimating a change in the actual density when the cement composition is positioned down hole; and adding an inert gas to the cement composition, the inert gas compensating for the estimated change in the actual density such that the actual density is about equal to the desired density when the cement composition is positioned down hole;

wherein the cement composition comprises a plurality of heads, and wherein the change in actual density results from the breakage of at least one of the beads when the cement composition is positioned in the well bore.

18. The method of claim 17 wherein inert gas phase is added to the cement composition via in situ formation of the inert gas while the cement composition is positioned down hole.

19. The method of claim 17 wherein the pressure exerted on the cement composition by the formation is at least 1,000 pounds per square inch.

20. The method of claim 17 wherein the compressive strength of the cement composition is at least 2,000 pounds per square inch.

* * * * *